(12) United States Patent
Crosson Smith

(10) Patent No.: US 7,236,957 B2
(45) Date of Patent: Jun. 26, 2007

(54) METHOD FOR REMOTELY AUTHORIZING A PAYMENT TRANSACTION FILE OVER AN OPEN NETWORK

(75) Inventor: Steven A. Crosson Smith, Winnersh (GB)

(73) Assignee: Bottomline Technologies (DE) Inc., Portsmouth, NH (US)

( * ) Notice: Subject to any disclaimer, the term of this patent is extended or adjusted under 35 U.S.C. 154(b) by 281 days.

(21) Appl. No.: 10/776,407

(22) Filed: Feb. 10, 2004

(65) Prior Publication Data

US 2005/0177521 A1    Aug. 11, 2005

(51) Int. Cl.
G06Q 99/00 (2006.01)
H04K 1/00 (2006.01)
H04L 9/00 (2006.01)

(52) U.S. Cl. .......................................... 705/50; 705/51
(58) Field of Classification Search ................... 705/65, 705/76, 26, 40; 713/176, 170; 380/28; 709/201
See application file for complete search history.

(56) References Cited

U.S. PATENT DOCUMENTS

| | | | | |
|---|---|---|---|---|
| 4,868,877 A * | 9/1989 | Fischer | ........................ | 713/157 |
| 5,659,616 A * | 8/1997 | Sudia | ........................... | 705/76 |
| 5,668,953 A * | 9/1997 | Sloo | ............................... | 705/1 |
| 5,677,955 A * | 10/1997 | Doggett et al. | ................ | 705/76 |
| 5,895,450 A * | 4/1999 | Sloo | ............................... | 705/1 |
| 6,061,449 A * | 5/2000 | Candelore et al. | ............. | 380/28 |
| 6,327,578 B1 * | 12/2001 | Linehan | ........................ | 705/65 |
| 6,330,551 B1 * | 12/2001 | Burchetta et al. | ............. | 705/80 |
| 6,609,200 B2 * | 8/2003 | Anderson et al. | ............. | 713/176 |
| 6,629,081 B1 * | 9/2003 | Cornelius et al. | .............. | 705/30 |
| 6,766,307 B1 * | 7/2004 | Israel et al. | ..................... | 705/80 |
| 6,820,199 B2 * | 11/2004 | Wheeler et al. | ............. | 713/170 |
| 6,889,325 B1 * | 5/2005 | Sipman et al. | ............... | 713/176 |
| 6,915,430 B2 * | 7/2005 | Wheeler et al. | ............. | 713/170 |
| 7,024,395 B1 * | 4/2006 | McCown et al. | .............. | 705/65 |
| 7,039,605 B2 * | 5/2006 | Kuwahara et al. | ............ | 705/26 |
| 2002/0010684 A1 * | 1/2002 | Moskowitz | ................... | 705/75 |
| 2002/0016745 A1 * | 2/2002 | Kuwahara et al. | ............ | 705/26 |
| 2002/0016910 A1 * | 2/2002 | Wright et al. | ................ | 713/150 |

(Continued)

OTHER PUBLICATIONS http://privacy.cs.cmu.edu/dataprivacy/HIPAA/020808finalprivacy mods-sect1.pdf—Excerpt from HHS Privacy Modifications Aug. 8, 2002 appearing in Federal Register Aug. 14, 2002.*

(Continued)

Primary Examiner—Andrew J. Fischer
Assistant Examiner—Evens Augustin
(74) Attorney, Agent, or Firm—Timothy P. O Hagan

(57) ABSTRACT

A method for obtaining an approval of an electronic fund transfer (EFT) disbursement file from a user of a remote system and transferring the EFT disbursement file to a payments processor. The method comprises generating a digest, by performing a hash of the EFT disbursement file, and transferring the digest to the remote system along with authorization control code. The authorization control code drives the remote system to obtain a digital signature of authenticated attributes, which includes the digest, and generate an authorization response. The method further comprises receiving the authorization response from the remote system and transferring an electronic funds submission to the payments processor. The electronic funds submission comprises the payment transaction file and at least a portion of the authorization response comprising the digital signature.

7 Claims, 9 Drawing Sheets

U.S. PATENT DOCUMENTS

2002/0046335 A1* 4/2002 Baum-Waidner ............ 713/156
2003/0191709 A1* 10/2003 Elston et al. ................. 705/40
2004/0230797 A1* 11/2004 Ofek et al. ................. 713/168
2005/0138110 A1* 6/2005 Redlich et al. ............. 709/201
2005/0192896 A1* 9/2005 Hutchison et al. ............ 705/40

OTHER PUBLICATIONS

Financial Times. London (UK): Jul. 5, 2000. p. 14—Software that leaves hackers out in the cold: The UK company's software supplies a unique thumbprint for each PC, enabling enterprise servers to decide whether or not to grant access.*

Data Privacy Laboratory Institute for Software Research International—School of Computer Science Carnegie Mellon University—Pittsburgh, PA 15213 $_\lambda$Configurable Security Protocols for Multi-party Data Analysis with Malicious Participants—Bradley Malin, Edoardo Airoldi, Samuel Edoho-Eket, and Yiheng Li Sep. 2004.*

* cited by examiner

| Authorization Request 102 | | |
|---|---|---|
| Summary Attributes 105 | Code 107 | Digest 104 |

Figure 2a

| Dummy Data Structure 127 | | |
|---|---|---|
| Dummy Digest 129 | Dummy Digital Signature 131 | Digital Certificate 96 |

Figure 2b

| Authentication Data Structure 123 | | |
|---|---|---|
| Digest 104 | Digital Signature 110 | Digital Certificate 96 |

Figure 2c

| Authorization Response 112 | | | | |
|---|---|---|---|---|
| Authentication Data Structure 123 | | | Verification Component 117 | |
| Digest 104 | Digital Signature 110 | Digital Certificate 96 | Summary Attributes 105 | Digest 104 |

Figure 2d

| User Authentication and Access Level Table 40 ||||  |
|---|---|---|---|---|
| Authorized User 50 | Log-On Credentials 51 || Access Permissions 52 ||
| | User Name 42 | Password 44 | Payment File Entry 46 | EFT Disbursement File Approval 48 |
| User A | User A | Password A | Yes | Yes |
| | | | | |
| | | | | |
| | | | | |
| | | | | |

| Payments Database 56 | | | | | | | |
|---|---|---|---|---|---|---|---|
| Index 58 | Payment File ID 60 | Payee 62 | Amount 64 | Status 66 | Entry ID 68 | Approval ID 70 | Payment Date 72 |
| | | | | | | | |
| | | | | | | | |
| | | | | | | | |
| | | | | | | | |

METHOD FOR REMOTELY AUTHORIZING A PAYMENT TRANSACTION FILE OVER AN OPEN NETWORK

TECHNICAL FIELD

The present invention relates generally to a computerized payment management system and method, and more specifically, to a computerized payment management system and method for enabling a user of a remote system to authorize a payment transaction file over an open network.

BACKGROUND OF THE INVENTION

A typical business utilizes an accounting software system (or an accounting module to its enterprise resource planning system or other database systems) that maintains a database of the business' transactions with its customer, vendors, employees, banks, and other third parties associated with the business. Such accounting systems are typically architected as a transaction database wherein data is input into the system through predefined transactions and extracted from the system utilizing database reporting modules.

In the early accounting systems, payments to third party payees were effectuated entirely outside of the accounting software system. An appropriately authorized operator would utilize a reporting module to obtain a listing of payments to be made to various payees. The operator would then issue a payment draft or check to each payee either by manually filling in payment information in a pre-printed draft form or by entering the payment into a secure check printing software system which, in turn, prints each draft on either a pre-printed form or on blank check stock. After the drafts are printed, the operator will enter one or more payment transactions into the accounting system to indicate that the payments have been issued.

With advanced payment management solutions, the accounting system may output a payments file which includes a plurality of records, each reflecting a payment to be issued. An appropriately authorized operator would import the payments file to the payments management solution. A check printing module of the payments management solution prints a draft corresponding to each record within the payments file on either a pre-printed form or on blank check stock. After the drafts are printed, the operator will typically enter only a single acknowledgement transaction into the accounting system to indicate that all payments within the payments file have been issued.

More advanced solutions may support electronic fund transfer payments. More specifically, the payments management solution may receive a payments file from the accounting system and generate a plurality of electronic fund transfer transactions for execution by an applicable financial institution.

When an electronic fund transfer transaction file is transferred to a financial institution, there is a well recognized need for the financial institution to be assured that the transaction file is accurate and appropriately authorized. One known solution utilized for assuring that a transaction file is accurate and appropriately authorized is a system utilized by the Bankers Automated Clearing System (BACS) and referred to as BACSTEL IP. In the BACSTEL IP system, a member financial institution (or some other trusted certificate authority) issues a digital certificate—which binds a public key of an asymmetric key pair to a user who is known to have the authority to authorize electronic fund transaction payments (e.g. an authorized user). The digital certificate and the private key of the key pair is securely stored on a smart card or other hardware key that is issued to the authorized user.

The authorized user runs a BACSTEL IP digital signature software component on his or her computer along with a program for interfacing with the financial institutions BACSTEL IP systems and an interface to a smart card reader.

The digital signature software component receives a data file from a higher level system and performs the following processes. First, the component performs a first SHA-1 hash of the data file to generate a 160-bit string commonly known as a digest. An SHA-1 hash is a well known secure hash algorithm developed by the National Institute of Standards and Technology which is useful for generating a 160-bit hash of any data file with a size up to $2^{64}$ bits in length. The component then combines the digest with other message attributes such as the current date and attribute type. The combination is referred to as the authenticated attributes. The authenticated attributes are then SHA-1 hashed to generate a second 160-bit hash string. The second 160-bit string is passed to the user's smart card. The smart card returns a digital signature of the 160-bit string along with the user's digital certificate and certificate chain. The component then generates a data structure known as a PKCS#7 which includes the digest, the digital signature, and the authorized user's digital certificate and certificate chain. The PKCS#7 and the electronic fund transfer transaction file are then passed to the BACSTEL IP systems.

The smart card, in conjunction with its PC resident driver code, comprises executable code which receives data for digital signature, prompts the authorized user to input a secret PIN number for authentication, and, in response to receiving the correct PIN number, returns a digital signature of the file along with the user's certificate and certificate chain.

When an authorized user is ready to submit an electronic fund transfer file to the BACSTEL system, the following process is used to assure that the transaction file is accurate and appropriately authorized.

First, the user's system presents the electronic fund transfer transaction file to the digital signature software component. As discussed above, the component will return a PKCS#7 data structure which includes a digest of the transaction file, a digital signature of the authenticated attributes, and the user's digital certificate and certificate chain.

The user's system then establishes a secure socket layer (SSL) connection to the financial institution's BACSTEL system. After the SSL connection is established, the BACSTEL system provides an authentication challenge to the user's system. The authentication challenge includes a randomly generated message.

Upon receipt of the authentication challenge, the user's system presents the random message to the digital signature software component which returns a digital signature and the user' digital certificate and certificate chain. These are passed back to the BACSTEL system.

After receiving an indication that the BACSTEL system has authenticated the user (the digital signature is that of the authorized user identified in the digital certificate), the user's system presents the PKCS#7 data structure and the transaction file to the BACSTEL system.

The financial institution can verify the integrity of the transaction file by verifying the signature (e.g. calculating a hash of the authenticated attributes for comparison to the result of decrypting the digital signature). If the digital signature is valid, the bank is assured that the transaction file presented to the BACSTEL system is the same transaction file presented to the digital signature software component.

There exists a desire in the industry to manage payments utilizing a payments solution located on a centralized server that is accessible by remote thin client devices over open networks such as the Internet. This client server architecture retains all data on the centralized server resulting in the payment data being more secure and more easily audited. Further, the entire payment solution being located on a centralized server is more easily maintained than multiple remote systems.

The problem with the above described digital signature solution is that it requires that the entire transaction file be located on the user's system so that it can be presented to the digital signature software component. This creates at least one problem.

If the transaction file is originally generated on a centralized server, the entire transaction file must be transferred to the remote client for digital signature. If the file is large, transferring the file can require significant network bandwidth and/or significant down load time if the user's connection is at a low data rate—such as dial-up. Further, transferring the transaction file to the remote client opens additional opportunities for a security breach as the transaction file may be inadvertently (or intentionally) stored in an insecure location on the remote client. Further yet, transferring the transaction file to the remote client creates audit issues as it would be possible to alter the transaction file on the user's system prior to digital signature and presentation to the BACSTEL system.

What is needed is a payments management system that includes a server and thin client architecture and enables a remote approver to authorize a payments file in a manner that does not suffer the disadvantages of transferring a transaction file to a user's remote system.

SUMMARY OF THE INVENTION

A first aspect of the present invention is to provide a method (performed by a centralized server) for obtaining an approval of an electronic fund transfer (EFT) disbursement file from a user of a remote system and transferring the EFT disbursement file to a payments processor.

The method comprises generating an authorization request and transferring the authorization request to the remote system along with authorization control code. The authorization request includes a digest.

The digest comprises a result of performing a hash on the electronic fund transfer disbursement file.

The authorization control code drives the remote system to obtain a digital signature of authenticated attributes and generate an authorization response. The authenticated attributes comprise the digest and other authenticated attributes such as the digital signature date. The authorization response includes at least the digital signature of the hashed authenticated attributes.

To generate the authorization response, the authorization control code may drive the remote system to generate and pass a dummy data string to a signing component to obtain a dummy authentication data structure and pass the authenticated attributes to the signing component to obtain the digital signature.

The dummy authentication data structure comprises a dummy digest, a dummy digital signature, a digital certificate of the authorized user and a valid digital certificate chain. The digital signature and the digest are combined with at least a portion of the dummy authentication data structure to generate an authentication data structure by replacing the dummy digital signature with the digital signature and replacing the dummy digest with the digest. The authentication data structure is included in the authorization response.

The method further comprises receiving the authorization response from the remote system; and transferring an electronic funds submission to the payments processor. The electronic funds submission comprises the payment transaction file and the at least a portion of the authorized response including the digital signature.

The method may further comprise authenticating the user of the remote system prior to transferring the authorization request to the remote system. Authenticating the user of the remote system comprises: i) obtaining logon credentials identifying the user of the remote system and; ii) determining whether the logon credentials match those of an authorized user. The step of transferring the authorization request to the remote system occurs only if the logon credentials match those of an authorized user.

The method may further yet comprise authenticating the user of the remote system to the payments processor prior to transferring the electronic funds submission to the payments processor. Authenticating the user to the payments processor comprises: i) receiving an authentication challenge from the payments processor; ii) transferring the authentication challenge to the remote system; iii) receiving an authentication response from the remote system; and iv) transferring the authentication response to the payments processor.

For a better understanding of the present invention, together with other and further aspects thereof, reference is made to the following description, taken in conjunction with the accompanying drawings. The scope of the invention is set forth in the appended claims.

BRIEF DESCRIPTION OF THE DRAWINGS

FIG. 2a is a table representing an authorization request in accordance with an exemplary embodiment of the present invention;

FIG. 2b is a table representing a dummy data structure in accordance with an exemplary embodiment of the present invention;

FIG. 2c is a table representing an authorization data structure in accordance with an exemplary embodiment of the present invention;

FIG. 2d is a table representing an authorization response in accordance with an exemplary embodiment of the present invention;

FIG. 8 is a table representing an exemplary payment database.

DETAILED DESCRIPTION OF THE INVENTION

Figure 1:
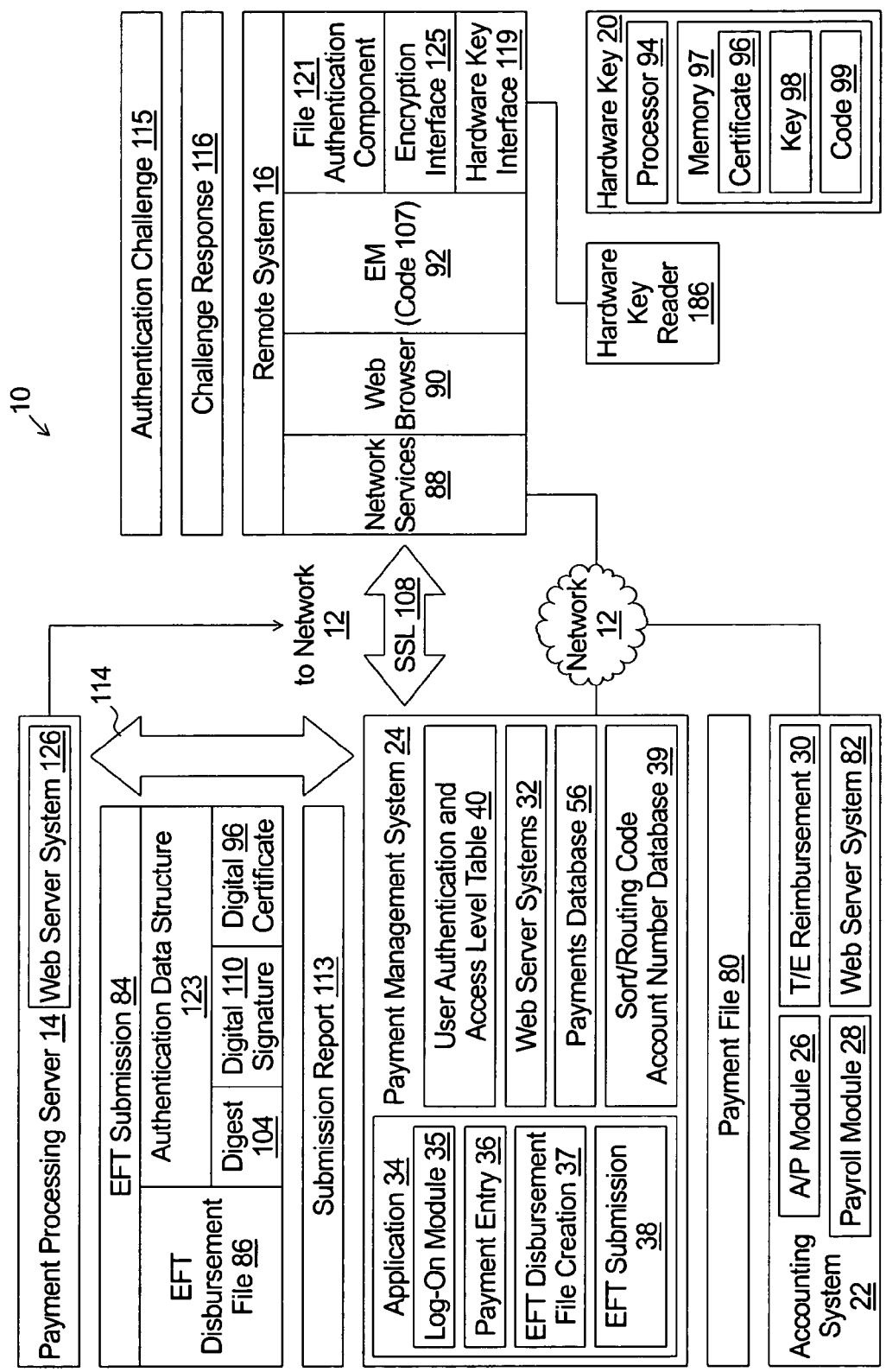
FIG. 1 is a block diagram useful for discussing an automated payment system in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit, module, or engine as used throughout this specification is intended to encompass a hardware circuit (whether discrete elements or an integrated circuit block), a processor executing code, or a combination of a hardware circuit and a processor executing code, or other combinations of the above known to those skilled in the art.

It should also be appreciated that for purposes of illustrating the exemplary embodiments of the invention, certain functions that may be performed by a processor executing software code have been grouped into elements referred to as circuits, modules, or engines. Such grouping of functions is for clarity of the discussion only and those skilled in the art of software design understand that grouping of functions within modular software design is a matter of design choice.

FIG. 1 illustrates exemplary architecture of an automated payment system 10 in accordance with one embodiment of the present invention. The architecture of the payment system 10 comprises an accounting system 22, a payment processing server 14, a payment management system 24, and at least one remote system 16, each of which communicates utilizing secure socket connections and TCP/IP protocols over various open network systems commonly known as the Internet 12. Those skilled in the art will recognize that as an alternative architecture, the various components may communicate with each other via dial up PSTN connections or ISDN connections. However, for purposes of illustrating an exemplary embodiment of the present invention, the architecture utilizing the Internet 12 will be described.

The accounting system 22 may comprise a known combination of an accounts payable module 26, a payroll module 28, a travel and entertainment expense reimbursement module 30, and other systems used by a business to record amounts due and/or paid to third parties. In the exemplary embodiment the accounting system 22 is structured as a server within a server/thin client architecture. As such, the web server system 82 of the accounting system 22 generates web pages (which may include executable or interpretable code as discussed above) that enables remote thin client systems, such as remote system 16, to enter transactions, generate reports, import files, and export files from the accounting system 22.

The payment processing server 14 may comprise a combination of secure servers controlled by a financial institution for receiving an electronic fund transfer (EFT) disbursement submission 84 in a predetermined format. In an exemplary embodiment, the payment processing server 14 may comprise a system for receiving an EFT disbursement submission 84 comprising an EFT disbursement file 86 which includes a plurality of records. Each record represents an electronic fund transfer payment. Exemplary EFT payments include BACS payments, however, SWIFT payments, and ACH payments are also envisioned.

The payment management system 24 may be embodied in software operated by one or more computer server systems. In operation, the payment management system 24 is useful for effecting electronic fund transfer (EFT) disbursements to third parties in accordance with payment instructions provided by the accounting system 22. More specifically, the management system 24 may receive a payment file 80 (which is exported by the accounting system 22) and generate an EFT submission 84 for transfer to the payment processing server 14. Alternatively, the payment management system 24 may provide manual data entry (MDE) screens to the remote system 16 enabling manual entry of payments for inclusion in an EFT submission 84.

Because electronic fund transfers can be an attractive means by which fraudulent individuals may practice their art and because the payment processing server 14, which is a portal for entry of EFT submissions, is coupled to the Internet 12, the payment management system 24 must operate systems for assuring that each EFT submission 84 that is provided to the payment processing server 14 is duly authorized by an account holder. More specifically, an EFT submission 84 not only includes the EFT disbursement file 86, but also includes an authentication data structure 123. The authentication data structure 123 includes a digest 104 of the EFT disbursement file 86, a digital signature 110 of hashed authenticated attributes 109 and a digital certificate of a duly authorized user and a certificate chain up to, but not including the root certificate (collectively referred to as the digital certificate and certificate chain 96)—all of which are discussed in more detail herein. In the exemplary embodiment, the authentication data structure is embodied in a PKCS#7 message or other similar message.

The components of the payment management system 24 useful for implementation of the present invention include a user authentication and access level table 40, a secure payments database 56, an event and menu driven application 34, and the web server system 32 for generating web pages which may include executable or interpretable code—each of which is discussed in more detail herein. The web pages enable remote thin client browser based systems 16 to interact with the payment management system 24.

The remote system 16 may be a typical personal computer system that includes a thin client or web browser 90 and a TCP/IP network module 88 for interfacing with web server systems 82 and 32 of each of the accounting system 22 and the payment management system 24 respectively. Further, the remote system 16 may include an execution module 92 to enable code provided by a web server system (which for purposes of the present invention will be code 107—discussed herein) to be executed on the remote system 16. For example, the execution module 92 may be known Object Linking and Embedding (OLE) supporting infrastructure embodied in a web browser for executing code in the form of an executable object component (such as an Active X control) provided by a web server system. Alternatively, the execution module 92 may be a virtual machine ported to the remote system 16 for interpreting and executing code provided in a scripting language such as JAVA.

The remote system 16 further comprises a hardware key interface 119, an encryption interface 125, and a file authentication component 121. The hardware key interface 119 interfaces between the encryption interface 125 and a hardware key 20 (via a hardware key reader 186).

In the exemplary embodiment, the hardware key 20 is embodied in a smart card that is uniquely assigned to the authorized user 50 and is coupled to the remote system 16 via a point-to-point hardware key interface 186 such as serial UART, USB, PCMCIA or similar interfaces. The hardware key 20 includes a processor 94 and nonvolatile memory 97. The nonvolatile memory 97 includes a digital certificate and certificate chain 96, a private encryption key 98, and code 99 for signing data presented for digital signature.

The digital certificate and certificate chain 96 includes: i) a public encryption key which corresponds to the private encryption key 98, ii) the identity of the authorized user 50 to which the hardware key 20 was issued, and iii) a trusted certificate authority's digital signature of both the public key and the identity of the authorized user 50.

The hardware key interface 119 provides for the hardware key 20 to perform a digital signature process only if the user enters a correct personal identification number (PIN). As such, upon receipt of data for signature from the encryption interface 125, the hardware key interface 119 provides for the remote system 16 to display a dialog box soliciting user input of his or her PIN. Upon receipt of the correct PIN, the hardware key interface 119 passes the data to the hardware key 20 for digital signature. Assuming that the PIN is correct, the hardware key 20 will encrypt the data presented with the private encryption key 98 thereby generating a digital signature and return the digital signature with the user's digital certificate and certificate chain 96.

The encryption interface 125 may be an operating system component such as the Cryptographic API (CAPI) that is part of Microsoft's Windows operating system. The encryption interface 125 interfaces between the file authentication component 121 and the hardware key interface 119. The purpose of the encryption interfaced 125 is to enable the file authentication component 121 to obtain a digital signature of data using standardized processing calls independent of the particular vendor of the particular technology of the hardware key interface 119, the hardware key reader 186, and the hardware key 20.

The file authentication component 121 may be a digital signature software component as discussed in the background. In response to receiving data as part of a processing call to digitally sign and package the data, the file authentication component 121: i) passes the data to the encryption interface 125 as part of a hash processing call; ii) obtains 160-bit string called a digest (e.g. and SHA-1 hash of the data) from the encryption interface 125; iii) combines the digest with other authenticated attributes; iv) passes the combination of the digest and the other authenticated attributes to the encryption interface 125 as part of a hash and sign processing call; v) receives the digital signature and digital certificate and certificate chain from the encryption interface 125; and vi) and builds an authentication data structure for return to the system that made the sign and package processing call to the authentication component 121. The authentication data structure is a data structure expected by the payment processing server and includes information for authenticating a payments file submitted therewith.

In addition, the file authentication component 121 may, in response to receiving data as part of a processing call to digitally sign the data only: i) pass the presented data to the encryption interface 125 for hashing and an applicable digital signature of the hash; ii) receive the digital signature from the encryption interface 125; and iii) presents the digital signature to the system that made the sign only processing call to the authentication component 121.

Figure 3:
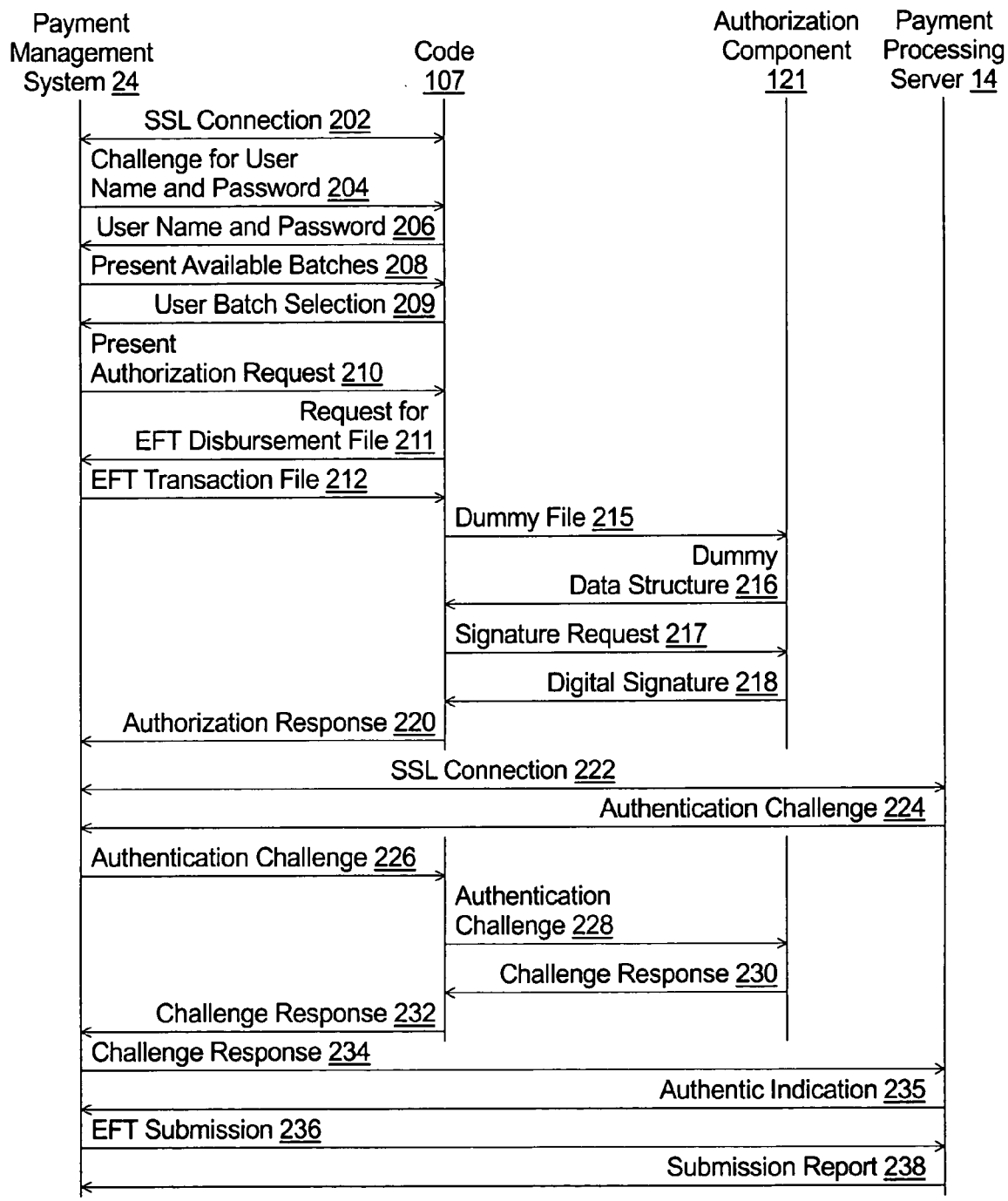
FIG. 3 is a ladder diagram representing an authorization processes in accordance with one embodiment of the present invention.

The ladder diagram of FIG. 3 represents exemplary operation of the systems for authorizing each EFT submission 84. Referring to FIG. 3, in conjunction with FIG. 1, step 202 represents establishment of a first secure socket layer (SSL) connection 108 between the payment management system 24 and a remote system 16. More specifically, the web browser 90 of the remote system 16 will interface with the network services module 88 to initiate the TCP/IP connection by initiating a known three-way TCP handshake with the web service system 32 of the payment management system 24. Thereafter, TLS handshaking is performed to complete the first SSL connection 108.

Step 204 and 206 represent authenticating the user of the remote system 16 to assure that such user has appropriate authority to authorize the EFT submission 84. More specifically, step 204 represents the web server system 32 of the payment management system 24 providing a user authentication web page to the remote system 16 over the first SSL connection 108. The user authentication web page includes: i) a user interface which requests that the user of the remote system 16 enter his or her user name and password; and ii) code to return the user name and password to the web server system 32 upon entry. Step 206 represents return of the user name and password to the web server system 32 over the first SSL connection 108.

Upon receipt, the payment management system 24 will verify that the user name and password provided by the user of the remote system 16 represent an authorized user. More specifically, and with brief reference to FIG. 4 in conjunction with FIGS. 1 and 2, the payment management system 24 includes a user authentication and access level table 40. The user authentication and access level table 40 comprises a plurality of records 54. Each record 54 is associated with an authorized user 50. Associated with each authorized user 50 are: i) the user's logon credentials 51 (including his or her user name 42 and password 44); and ii) the user's access permissions 52 which include an indication of certain functions that the user 50 is authorized to perform. For example, User A is authorized to perform payment file entry 46 and EFT disbursement file approval 48.

Assuming that the user name and password provided by the user match an authorized user 50, the SSL session is bound to the authorized user 50 and a web page menu is sent to the remote system 16 as represented by step 208. In the exemplary embodiment, the web page menu includes selectable menu choices that correspond to only those functions that the authorized user 50 may perform as set forth in the access permissions 52 of the user authentication and access level table 40.

When the authorized user elects to make an EFT submission to the payments processor 14, the payment management system 24 may calculate or obtain summary attributes 105 from a batch header(s) (of available batches) and present the summary attributes 105 (as part of a web page with control code 107) for display on the remote system 16 in a grid format.

The summary attributes 105 may include such values as the total number of EFT disbursements within the EFT disbursement file 86, the sum of all disbursements within the EFT disbursement file 86, the highest value EFT disbursements within the EFT disbursement file 86, and other attributes useful by a human operator for understanding the significance of the payments included with in the file 86.

The control code 107, when executed on the remote system 16: i) displays the summary attributes 105 to the authorized user 50 in a grid format, ii) solicits the authorized user 50 to select and EFT disbursement file 86 for approval by digital signature, and iii) upon user 50 election to approve the EFT disbursement file 86, solicits an authorization request 102, as shown in FIG. 2a, from the payment management system 24.

When the authorized user 50 of the remote system 16 selects an EFT disbursement file 86 for submission, the payment management system 24 compares the summary attributes 105 provided by the remote system 16 as part of the request to the locally generated summary attributes 105 to assure that there is a match, extracts the selected EFT disbursement file 86 from a payments database 56, performs an SHA-1 hash of the EFT disbursement file 96 to generate a digest 104, and encrypts the EFT disbursement file 86 for temporary storage.

The payment management system 24 then, at step 210, presents a web page to the remote system 16 which includes an authorization request 102. The authorization request 102 includes the digest 104, and the summary attributes 105. The authorization request 102 may be sent as a web page displaying the summary attributes 105 (the digest 104 is not displayed) and including authorization control code 107 which is executable or interpretable on the remote system 16 for soliciting: i) user selection to sign and return an authorization response 112 (e.g. selection of a sign button), and ii) user selection to view the entire EFT disbursement file 86 (e.g. selection of a view button).

The digest 104 operates as "digital fingerprint" that is useful for detecting any modification to the EFT disbursement file 86. More specifically, the hash algorithm is an algorithm specified by the payment processor 14 and is such that it is computationally infeasible to produce any alternate data file that yields the same hash result and even more infeasible to produce an alternate data file that both yields the same hash result and has controllable content such that it could be configured as an EFT disbursement file 86 with specifically controlled disbursement amounts to controlled payees. In the exemplary embodiment, the hash algorithm may be the SHA-1 secure hash algorithm.

If the authorized user 50 elects to view the entire EFT disbursement file 86, a request for the EFT disbursement file 86 is transferred to the payment management system 24 over the first SSL connection 108 as represented by step 211. In response, the payment management system 24 streams the entire EFT disbursement file 86 to the remote system 16 for user review as represented by step 212 in a separate browser window.

When the authorized user 50 electes to approve the EFT disbursement file 86 (e.g. selection of the sign button), the authorization control code 107, when executed on the remote system prepares an authorization response 112 as shown in FIG. 2d. The authorization response 112 comprises a response data structure 123 and verification components 117 which include the summary attributes 105 and the digest 104. The purpose of returning the summary attributes 105 and the digest 104 to the payment management system 24 is to assure that they have not been altered during the processes.

To prepare the authorization response 112, the authorization control code 107 builds and passes a dummy data string to the file authentication component 121 as part of a sign and package processing call as represented by step 215. The file authentication component 121 performs the steps previously discussed with respect to a sign and package processing call and returns, at step 216, a dummy authentication data structure 127 as represented by FIG. 2b.

The dummy authentication structure 127 is a data structure expected by the payment processing server 14 which includes information for authenticating a payments file 84 submitted therewith. However, because dummy data was presented with the processing call, the dummy authentication data structure 127 includes a dummy digest 129 (e.g. an SHA-1 hash of the dummy data file), a dummy digital signature 131 (e.g. a digital signature of an SHA-1 hash of a combination of additional authenticated attributes and the dummy digest 129), and the authorized user's digital certificate and certificate chain 96.

The authorization control code 107 further provides, at step 217, calculates the additional message attributes 111 (such as the signing date) and passes the combination of the digest and the additional message attributes 109 (e.g the authenticated attributes) to the file authentication component 121 as part of a digital signature only processing call. The file authentication component 121 performs the steps previously discussed with respect to a digital signature only processing call and returns, at step 218, a digital signature 110 of an SHA-1 has of the authenticated attributes.

After receiving a response to both the sign and package processing call and the digital signature only processing call, the authorization control code 107 prepares an authorization response 112 (as shown in FIG. 2d) for return to the payment management system 24 over the first SSL connection 108 as represented by step 220.

As discussed, the authorization response 112 comprises the authentication data structure 123 and verification components 117. To build the authentication data structure 123 for the authentication response 112, the authorization control code 107: i) replaces the dummy digest 129 in the dummy data structure 127 with the digest 104 from the authorization request 102; and ii) replaces the dummy digital signature 131 in the dummy data structure 127 with the digital signature 110 obtained in response to the signature only processing call.

Upon receipt of the authorization response 112, the payment management system 24: i) verifies that the verification components 117 match the summary attributes 109 and the digest 104 provided in the authorization request 102, and ii) builds an EFT submission 84 (as shown in FIG. 2e) for submission to the payment processing server 14, which as discussed, comprises the EFT disbursement file 86 and the authentication data structure 123.

The payment management system 24 then establishes a second SSL connection 114 with the payment processing server 14 as represented by step 222.

To ensure that any EFT submission 84 is authorized by a person who the financial institution has issued a hardware key 20, the payment processing server 14 includes a digital certificate verification system 86 for authenticating the user of any system making an EFT submission to the payment processing server 14 and verifying the integrity of the electronic fund transfer payment records within the EFT disbursement file 86 of the EFT submission 84.

After the second SSL connection 114 has been established, the payment processing server 14 presents an authentication challenge 115 to the payment management system 24 in a known manner at step 224. The authentication challenge 115 may include a randomly generated string and is presented as a request for: i) return of the digital certificate and certificate chain 96 of the authorized user 50; and ii) return of a digital signature of the randomly generated string.

By verifying the certificate authority's signature, the payment processing server 14 can be assured that the public encryption key is properly bound to the authorized user 50 and by verifying the authorized user's signature of the randomly generated string, the payment processing server 14 can be assured that it is the authorized user 50 that responded to the authentication challenge 115.

To enable the payment processing server 14 to authenticate the authorized user of the remote system 16, the payment management system 24 includes systems for responding the authentication challenge 115. More specifically, after the payment management system 24 receives the authentication challenge 115 on second SSL connection 114, it presents the authentication challenge 115 (as well as the credentials of the second SSL connection 114) to the remote system 16 on the first SSL connection 108 as represented by step 226. The authorization control code 107 running on the remote system 16 in turn presents the authentication challenge 115 to the file authorization component 121 as part of a sign and package processing call as represented by step 228.

The file authorization component 121 performs the steps previously discusse with respect to a sign and package processing call to generate a challenge response 116 which is returned to the code 107 as represented by step 230. The challenge response 116 includes a digital signature of the random string and the digital certificate and certificate chain 96 of the authorized user.

The code 107 returns the challenge response 116 to the payment management system 24 as represented by step 232. And, the payment management system 24 returns the challenge response 116 to the payment processing server 14 as represented by step 234.

After verification of the challenge response 116, the payment processing server 14 will accept an EFT submission 84 from the payment management system 24 and provide an indication that the challenge response 116 has been properly signed by an authorized user 50 as represented by step 235. Step 236 represents the payment management system 24 presenting the EFT submission 84 to the payment processing server 14.

Upon receipt of the EFT submission 84, the payment processing server 14 verifies the integrity of the EFT disbursement file 86 in a known manner. More specifically, the payment processing server 14 verifies that the digital signature 110 is a digital signature performed by the hardware key 20 assigned to the authorized user (that properly authenticated pursuant to steps 224–235) and verifies that the digest 104 matches the EFT disbursement file 86. If all verifications are complete, the payment processing server will generate a submission report and return the submission report to the payment management system 24 in a known manner as represented by step 238.

Payment Management System

As previously discussed, the payment management system 24 comprises the user authentication and access level table 40, a payments database 56, an event and menu driven application 34, and a web server system 32. The menu and event driven application 34 may include a multitude of functions useful for recording, reporting, and analyzing disbursement data. For purposes of illustrating the present invention, the event and menu drive application comprises at least a logon module 35, a payment file entry module 36 and an EFT disbursement file creation module 37, and an EFT submission module 38.

In operation, the logon module 35 includes functions related to establishing the first SSL connection 108 with the remote system 16, authenticating the user of the remote system 16, and presenting the menu of functions that the user of the remote system 16 is authorized to perform.

The payment entry module 36 includes functions related to importing the payment file 80 into the payments database 56.

The EFT disbursement file creation module 37 includes functions related to preparing the EFT disbursement file 86 in the applicable BACS format which may include any of a single batch, multiple batch, and bureau submission format.

The EFT submission module 38 includes functions related to: i) calculating the summary attributes 105; ii) calculating the digest 104; v) presenting the authorization request 102 to the remote system 16; vi) receiving an authorization response 112 from the remote system 16; vii) establishing the second SSL connection 114 with the payment processing server 14, viii) authenticating the user of the remote system 16 to the payment processing server 14; and ix) presenting the EFT submission 84 to the payment processing server 14.

Figures 4, 5:
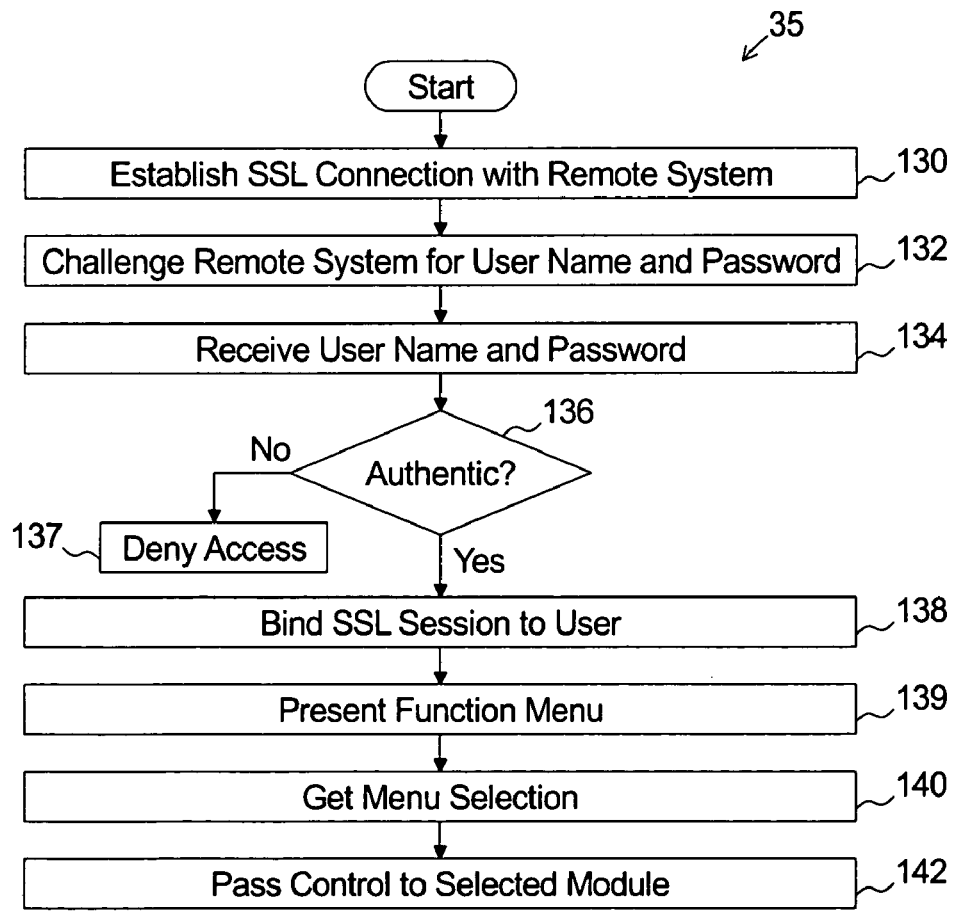
FIG. 4 is an exemplary user authentication and access level table.
FIG. 5 is a flow chart representing operation of a log on module in accordance with one embodiment of the present invention.

The flow chart of FIG. 5 represents exemplary operation of the application 34 performing the functions of the log on module 35. With reference to FIG. 5 in conjunction with FIG. 1, step 130 represents the application 34 interfacing with the web server system 32 to establish the first SSL connection 108 with the initiating remote system 16.

After the first SSL connection 108 is open, step 132 represents the application 34 providing the user authentication web page to the remote system, and step 134 represents receiving the user name and password.

Step 136 represents the application 34 comparing the user name and password tendered by the remote system 16 to logon credentials 51 (FIG. 4) of authorized users 50 to identify the authorized user 50 and determine his or her access permissions 52. If the tendered user name and password do not match logon credentials 51 at step 136, access is denied at step 137. If the tendered user name and password match the logon credentials 51 of an authorized user 50, then the application 34 binds the SSL connection 108 to the authorized user 50 at step 138 and, at step 139 presents a menu web page to the remote system 16 for display.

After logon, the application 34 operates as a menu driven application for each remote system 16 that has open SSL communication channel to the application 34 and has an authorized user 50 properly logged on.

After presenting the menu web page, the application 34 may receive a menu selection at step 140 and, in response thereto, passes control to the module that performs the functions associated with the menu choice at step 142.

Figure 6:
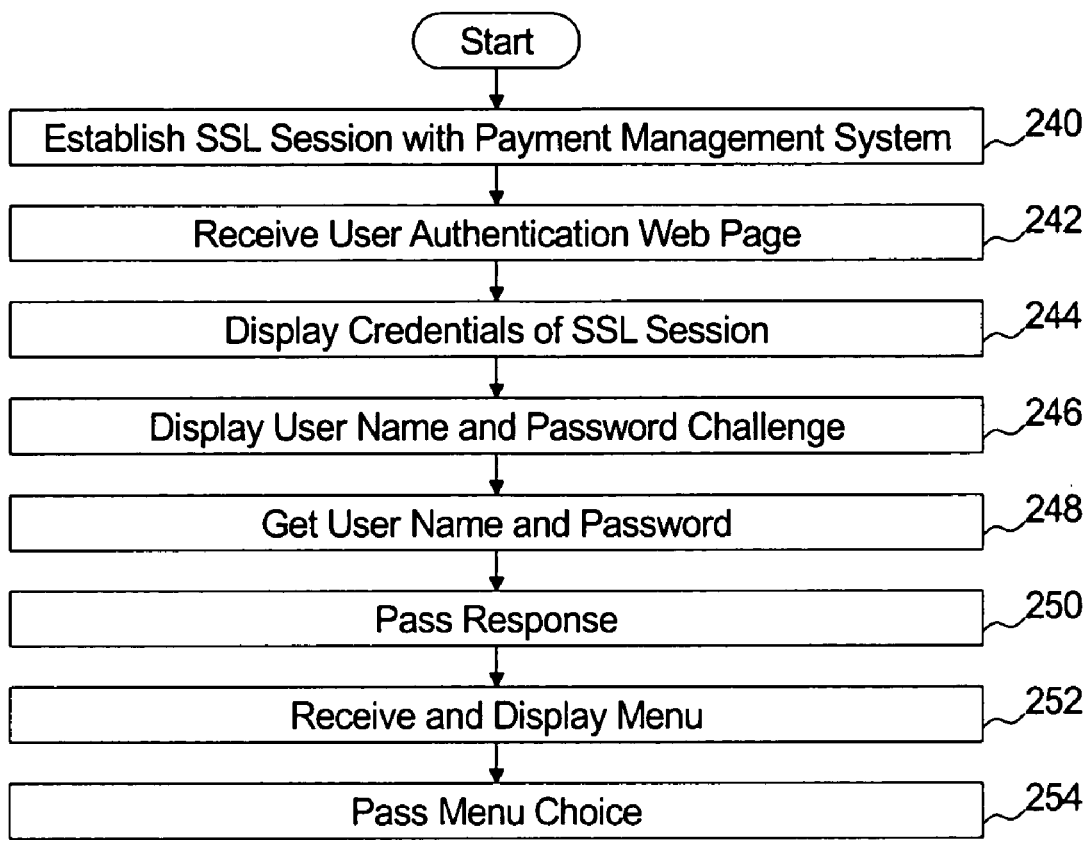
FIG. 6 is a flow chart representing exemplary steps useful for authenticating a user of a remote system in accordance with one embodiment of the present invention.

The flow chart of FIG. 6 represents exemplary processing steps performed by the remote system 16 which correspond to the steps of the log on module 35 of the application 34.

Step 240 represents initiating the first SSL connection 108 to the payment management system 24. Step 240 corresponds to step 130 of FIG. 5 which represents the application 34 establishing the first SSL connection 108 in response to initiation by the remote system 16.

Step 242 represents receiving the user authentication web page. Step 242 corresponds to step 132 of FIG. 5 which represents the application 34 providing the user authentication web page to the remote system 16.

Steps 244 through 250 represent steps performed by code 240 that is: i) included as part of the user authentication web page that is passed to the remote system 16; and ii) executable or interpretable by the remote system 16.

Step 244 represents displaying the credentials of the SSL connection 108 such that the user may verify that the remote system 16 has connected to the correct payment management system 24.

Step 246 represents displaying the user name and password challenge thereby prompting the user to enter his or her user name and password.

Step 248 represents receiving the user name and password tendered by the user.

Step 250 represents passing the tendered user name and password to the application 34. Step 250 corresponds with step 134 of FIG. 5 which represents the application 34 receiving the tendered user name and password.

Step 252 represents receiving and displaying the menu web page. Step 252 corresponds with step 139 of FIG. 5 which represents the application 34 providing the menu web page to the remote system 16.

Step 254 represents passing the user's selected menu choice to the application 34. Step 254 corresponds with step 140 of FIG. 5 which represents the application 34 receiving the menu selection from the remote system.

Figure 7:
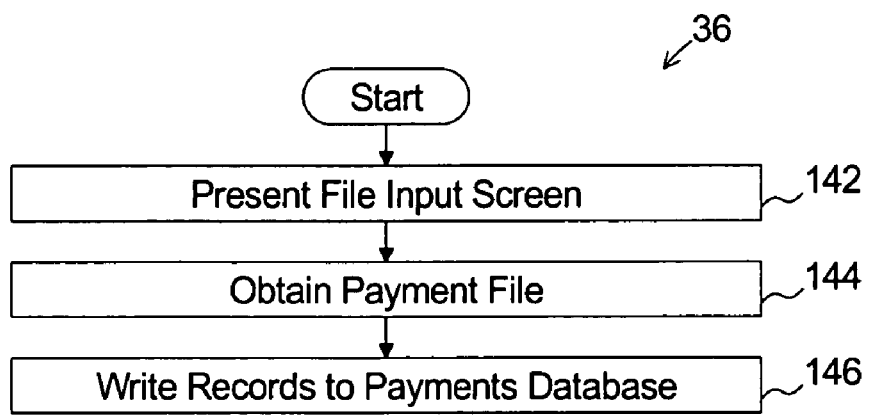
FIG. 7 is a flow chart representing exemplary steps for importing a payment file into an automate payment system.

The flow chart of FIG. 7 represents exemplary operation of the application 34 performing the functions of the payment entry module 36. With reference to FIG. 7 in conjunction with FIG. 1, step 142 represents the application 34 presenting a file input web page to the remote system in response to the user selecting the menu choice to import a payment file 80 into the payment management system 24. The file input web page may be a web page that includes code executable or interpretable by the remote system 16 for enabling the authorized user 50 of the remote system to identify the payment file 80 within a directory and to upload the file as a binary object to the payment management system 24. Step 144 represents receiving the binary object representing the payment file 80 and step 146 represents writing each payment record from the payment file 80 to the payment database 56.

Referring briefly to FIG. 8, the payment database 56 includes a plurality of records 57, each of which represents a disbursement. Each field 57 is identified by a unique index 58. Associated with the unique index 58 are a payment file ID 60, identification of the payee 62, the amount of the payment 64, the status of the payment 66, the entry identification 68 which is the identification of the authorized user 50 entering the payment 68, the approval identification 70 which is identification of the authorized user 50 submitting the payment as part of an electronic fund transfer batch, and a payment date 72.

Figure 9:
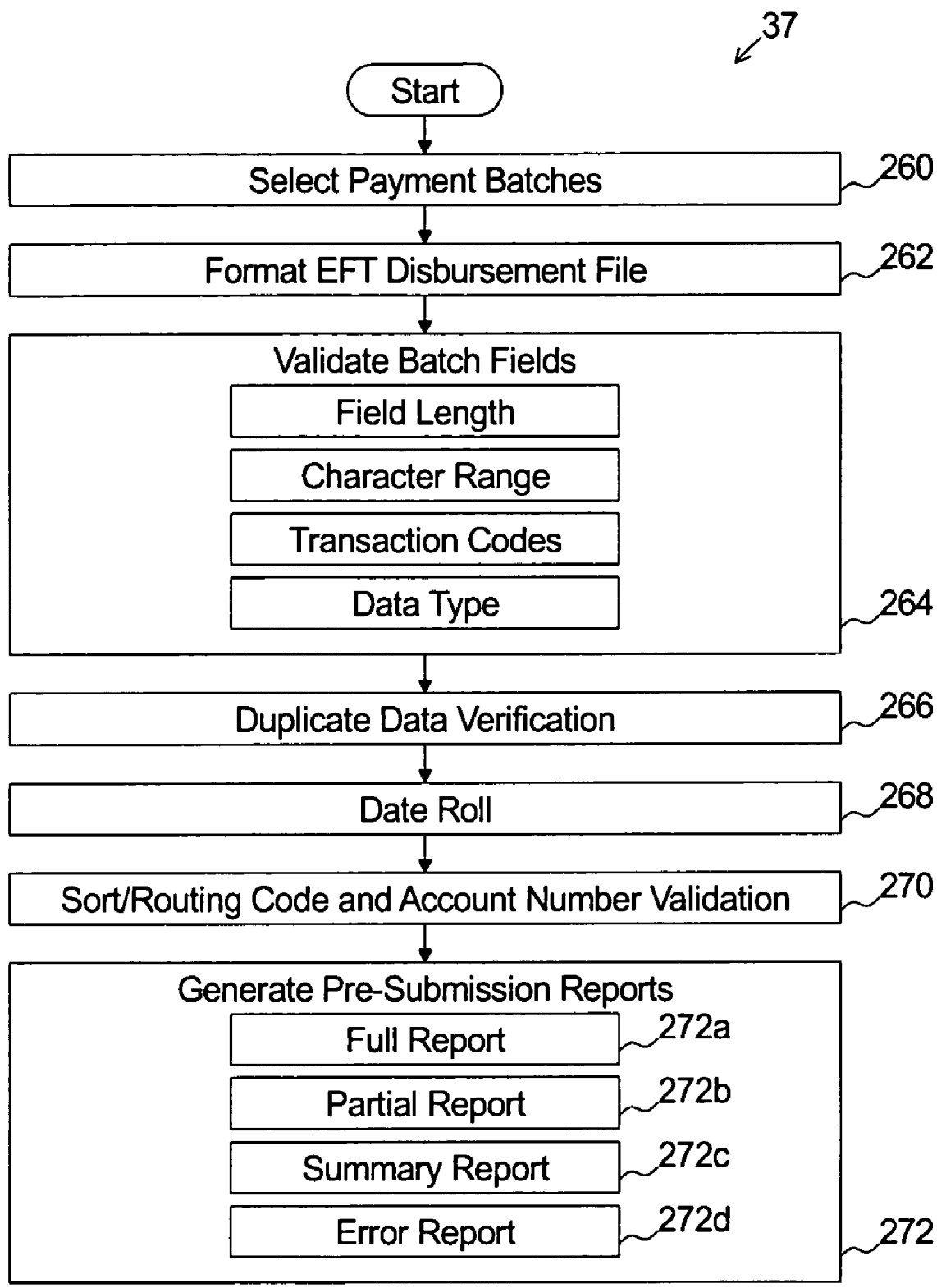
FIG. 9 is a flow chart representing operation of an EFT disbursement file creation module in accordance with one embodiment of the present invention.

The flow chart of FIG. 9 represents exemplary operation of the application 34 performing the functions of the EFT disbursement file creation module 37. With reference to FIG. 9 in conjunction with FIG. 1, step 260 represents selecting batches of payments for inclusion within the EFT disbursement file 86. This step may be performed by presenting various web pages to the remote system 16 and receiving selections tendered by an authorized user 50.

Step 262 represents formatting the selected payments to create an EFT disbursement file 86 in the format required by the payment processing server 14. In the exemplary embodiment, the step of formatting the 142 the EFT disbursement file 86 may comprise formatting batches of payments as a BACS single batch submission, a BACS multiple batch submission, or a BACS bureau submission.

Step 264 represents validating batch fields of the EFT disbursement file 86. More specifically, the application 34 validates field length, character range, transaction codes, and data type for fields within the batch.

Step 266 represents performing a duplicate data verification. More specifically, the application 34 compares the batches of payments selected for inclusion within the submission with batches included within other submissions. By using comparison rules, if there is similarity above a threshold, the application 34 will warn the user that a batch may be a duplicate.

Step 268 represents performing a date roll. More specifically, the application 34 verifies that the payment date 72 of each payment included within the batch matches the business day on which the batch is to be paid by the financial institution controlling the payment processing server 14—and changes the payment date 72 if required.

Step 270 represents validating the sort code (or routing code) and account numbers for each payment within the EFT disbursement file 96. More specifically each sort code (or routing code) and each account number of each record is compared with valid sort codes (or routing codes) and account numbers as represented by a sort/routing code and account number database 39

Step 272 represents generating pre-submission reports. The pre-submission reports may include a full report which provides payment detail of every disbursement within the batch, a partial report which provides payment detail for only the largest disbursements within the batch, a summary report which provides summary values calculated from the batch such as total quantity of transactions and total transaction value, and an error report which includes field, character, transaction code, and data type errors that may have been discovered when performing batch validation. These reports may be part of the summary attributes 105 which are presented to the remote system 16 for review by the authorized user 50.

Figure 10:
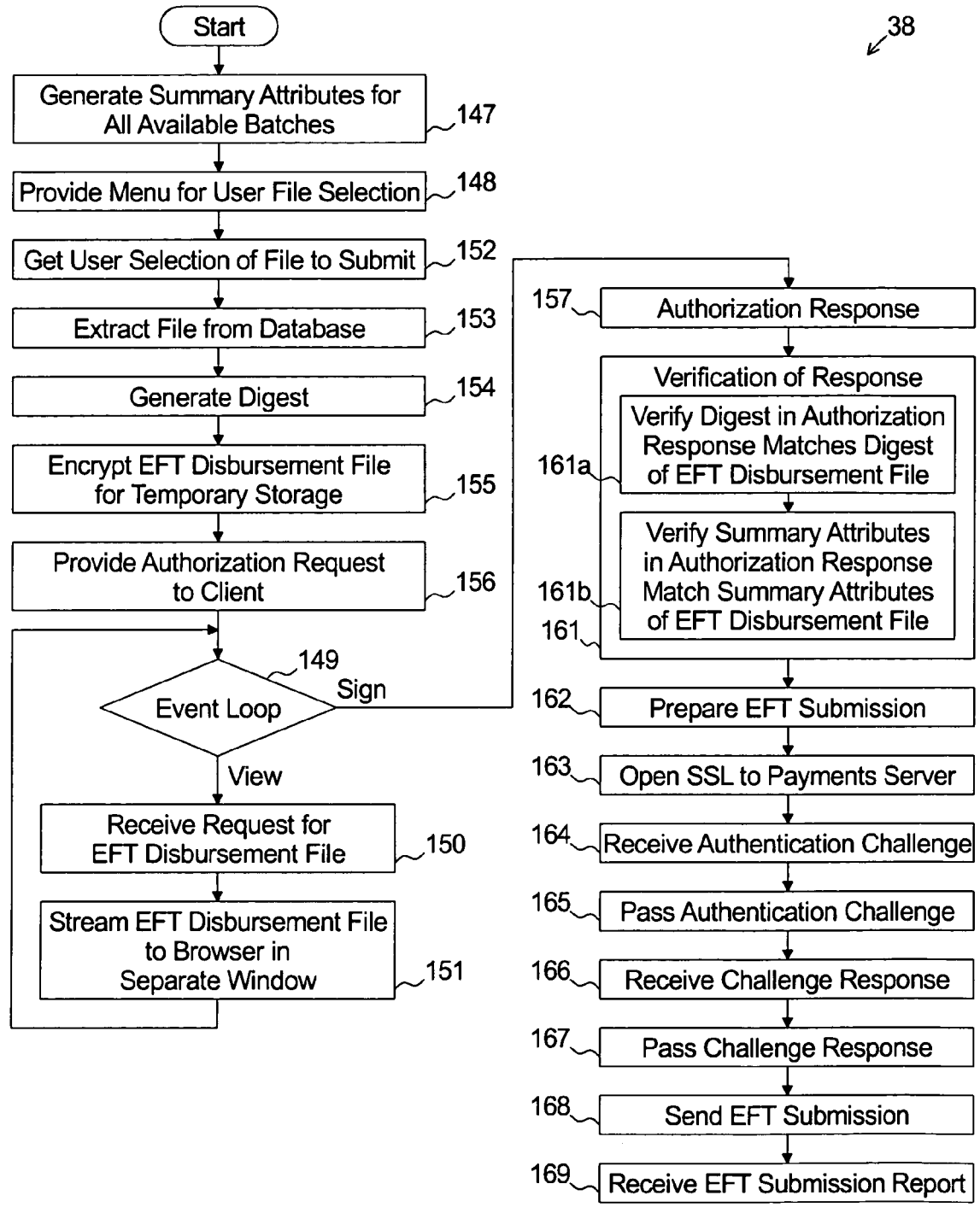
FIG. 10 is a flow chart representing operation of a payment submission module in accordance with one embodiment of the present invention.

The flow chart of FIG. 10 represents exemplary operation of the application 34 performing the functions of the payment submission module 38. With reference to FIG. 10 in conjunction with FIG. 1, step 147 generating summary attributes for available batches and step 148 represents providing the summary attributes in a grid on a web page to the remote system 16 for user selection of an EFT disbursement file 86 (corresponding to the selected summary attributes) for submission to the payments processor 14.

Step 152 represents the application 34 receiving the user's selection of the EFT disbursement file 86 that the authorized user 50 desires to submit to the payment processing server 14.

Step 153 represents extracting the selected EFT disbursement file 86 from the payments database 56, step 154 represents generating the digest 104 of the EFT disbursement file 86, and step 155 represents encrypting the EFT disbursement file 86 for temporary storage outside of the encrypted database 56. Steps 153, 154, and 155 may be performed in parallel.

Step 156 represents building the authorization request 102 and sending the authorization request 102 to the remote system 16 over the first SSL connection 108 as previously discussed with respect to FIG. 3.

After the authorization request 102 has been sent to the remote system 16, the application 34 enters an event loop (represented by box 149) wherein it is waiting for the remote system to respond with either a request for the entire EFT disbursement file 86 (if the user selects the button to view the entire EFT disbursement file 86) or with an authorization response 112 (after the remote system performs various steps in response to the user selecting the sign button).

In the event that the remote system 16 responds with a request for the entire EFT disbursement file 86 as represented by step 150, the EFT disbursement file 86 is streamed to the remote system 16 at step 151.

In the event that the remote system 16 responds with an authorization response 112 as represented by step 157, then the application 34 performs a series of steps needed to: i) verify the integrity of the remote authorization; ii) prepare the EFT submission 84 iii) authenticate the user of the remote system 16 to the payment processing server 14; and iv) present the EFT submission 84 to the payment processing server 14.

More specifically, step 161 represent verifying the verification components 117 of the authorization response 112. Specifically step 161a represents verifying that the digest 104 in the authorization response 112 matches the digest 104 included in the authorization request 102. Step 161b represents verifying that the summary attributes 105 in the authorization response 112 matches the summary attributes 105 in the authorization request 102.

Step 162 represents preparing the EFT submission 84 by combining the EFT disbursement file 86 with the authentication data structure 123 from the authorization response 112.

Step 163 represents opening the second SSL connection 114 to the payment processing server 14 as previously discussed with respect to step 222 of FIG. 3.

Step 164 represents the application 34 receiving the authentication challenge 115 from the payment processing server 14 over the second SSL connection 114 and step 165 represents the application 34 passing the authentication challenge 115 to the remote system 16 over the first SSL connection 108 as previously discussed with respect to steps 224 and 226 of FIG. 3 respectively.

Step 166 represents the application 34 receiving the challenge response 116 from the remote system 16 over the first SSL connection 108 and step 167 represents the application 34 passing the challenge response 116 to the payment processing server 14 over the second SSL connection 114 as previously discussed with respect to steps 232 and 234 of FIG. 3 respectively.

Assuming that the authentication challenge 116 properly identifies the authorized user 50 of the remote system 16, step 168 represents passing the EFT submission 84 to the payment processing server 14 over the second SSL connection 114 and step 169 represents receiving the submission report 238 back from the payment processing server 14 in a known manner as previously discussed with respect to steps 236 and 238 of FIG. 3 respectively.

Figure 11:
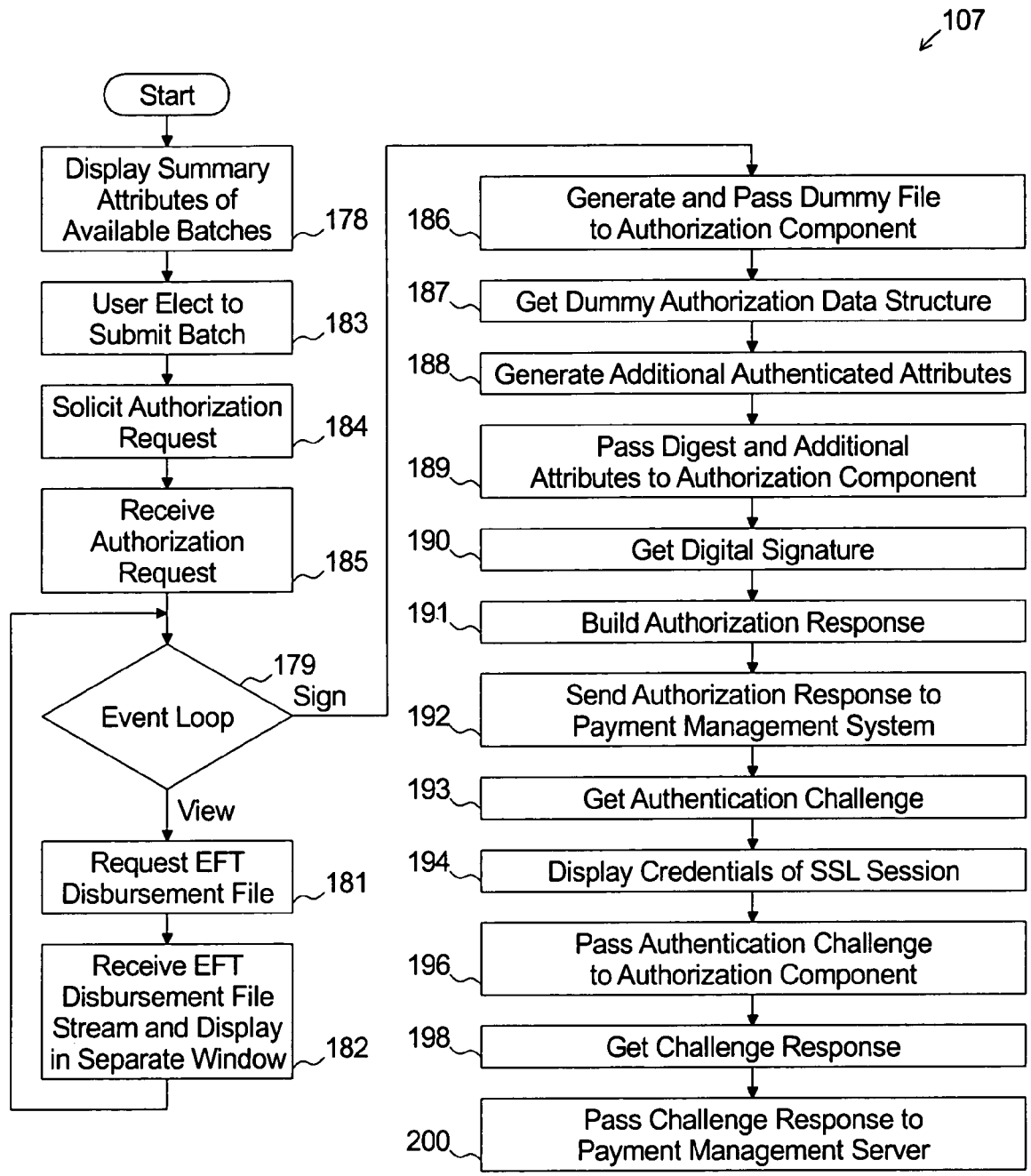
FIG. 11 is a flow chart representing exemplary operation of code soliciting user approval of an authorization request in accordance with one embodiment of the present invention.

The flow chart of FIG. 11 represents exemplary processing steps performed by the remote system 16 which correspond to the steps of the payment submission module 38 of the application 34. The steps of the flow chart of FIG. 11 may be steps performed by the authorization control code 107 provided in conjunction with the authorization request 102 and executable or interpretable by the remote system 16.

Step 178 represents displaying the summary attributes 105 provided to the remote system 16 (as part of a web page and in grid format) for user selection of an EFT disbursement file 86 for submission.

Step 183 represents obtaining the user's selection of an EFT disbursement file 86 for approval. An indication of the selection along with the summary attributes of the selected EFT disbursement file 86 is returned to the application 34 of the SSL connection 108 at step 184. Step 185 represents receiving an authorization request 102 from the application 34. Step 185 corresponds to step 156 previously discussed with respect to FIG. 10.

After displaying the summary attributes 105 as provided in the authorization request 102, the remote system 16 enters an event loop waiting for the user to select to either view the entire EFT disbursement file 86 (e.g. the view button) or to authorize submission of the EFT disbursement file 86 (e.g. the sign button). The event loop is represented by box 179.

In the event that the authorized user 50 elects to view the entire EFT disbursement file 86, the authorization control code 107 included with the web page generates a request to the application 34 over the SSL connection 108 at step 181. Such request corresponds to step 150 as previously discussed with respect to FIG. 10. Step 182 then represents receiving the EFT disbursement file 86 for display.

In the event that the authorized user 50 elects to approve the disbursement file 86 (e.g. selection of the sign button), a dummy data file is generated and passed to the file authentication component 121 as part of a sign and package processing call at step 186. Step 187 represents receiving the dummy data structure 127 back from the file authentication component 121.

Step 188 represents generating the additional message attributes 111 such as the signing date.

Step 189 represents passing the authenticated attributes 109 (e.g. digest 104 and additional message attributes 111) to the file authentication component 121 as part of a sign only processing call and step 190 represents receiving the digital signature 110 back from the file authentication component 121.

Step 191 represents building the authorization response 112 and step 192 represents sending the authorization response 112 to the application 34 as previously discussed with respect to step 220 of FIG. 3.

Step 193 represents receiving the authentication challenge 115 (and credentials of the SSL connection 114 established with the payments processing server 14) that is initiated by the payment processing server 14 as previously discussed with respect to step 226 of FIG. 3. Step 193 corresponds to step 165 of FIG. 10 which represents the application 34 passing the authentication challenge 115 to the remote system 16.

Step 194 represents displaying the credentials of the SSL connection 114.

Step 196 represents passing the authentication challenge 115 to the file authentication component 121 as part of a sign only processing call and step 198 represents receiving the challenge response 116 back from the file authentication component 121 as previously discussed with respect to steps 228 and 230 of FIG. 3 respectively.

Step 200 represents passing the challenge response 116 to the application 34 over the SSL connection 108 as previously discussed with respect to step 232 of FIG. 3. Step 200 corresponds to step 166 of FIG. 10 which represents the application 34 receiving the challenge response 116 from the remote system 16.

It should be appreciated that the above described systems provide for a secure method of maintaining records or payments on a centralized database and provide for a secure method for an authorized user of a remote system to properly authorize an EFT disbursement file for submission to a payments processing server.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. A method for operating a server to generate an electronic fund transfer submission for transfer to a payments processor, the electronic fund transfer submission comprising an electronic fund transfer disbursement file and an authorization message of a predetermined data structure, the authorization message being received from a remote client system, the method comprising:
   generating a digest of the electronic fund transfer disbursement file by performing a hash on the electronic fund transfer disbursement file;
   transferring the digest to the remote system;
   transferring authorization control code to the remote system;
   executing the transferred the authorization control code being by the remote system to generate the authorization message on the remote system, generating the authorization message comprising the following steps:
   generating message attributes;
   generating authenticated attributes, the authenticated attributes comprising the message attributes and the digest;
   generating a digital signature of the authenticated attributes by passing the authenticated attributes to a file authentication component of the remote system as part of a digital signature request;
   generating a dummy data string;
   generating a dummy authorization message with the predetermined data structure by passing the dummy data string to the file authentication component of the remote system as part of an authorization response request, the dummy authorization message including a digest of the dummy data string; a digital signature of the digest of the dummy data string, and a digital certificate corresponding to the digital signature;
   generating the authorization message from the dummy authorization message by making the following replacements within the dummy authorization message: i) replacing the digest of the dummy data string with the digest of the electronic fund transfer disbursement file as provided by the server; and ii) replacing the digital signature of the digest of the dummy data string with the digital signature of the digest of the electronic fund transfer disbursement file; and
   returning the authorization message to the server;
   the server further receiving the authorization message from the remote system;
   combining the electronic fund transfer disbursement file with the authorization message to create the electronic fund transfer submission; and
   transferring the electronic fund transfer submission to the payments processor.

2. The method of claim 1:
   wherein the server further authenticates a user of the remote system by:
      obtaining logon credentials identifying the user of the remote system;
      determining whether the logon credentials match those of an authorized user; and
   the step of transferring the authorization control code to the remote system occurs only if the logon credentials match those of an authorized user.

3. The method of claim 2, wherein the server further authenticates the user of the remote system to the payments processor by:
   receiving an authentication challenge from the payments processor
   transferring the authentication challenge to the remote system;
   receiving an authentication response from the remote system; and
   transferring the authentication response to the payments processor.

4. A method for operating a server to generate an electronic fund transfer submission for transfer to a payments processor, the electronic fund transfer submission comprising an electronic funds transfer disbursement file and an authorization message of a predetermined data structure, the authorization message being received from a remote system, the method comprising:
   generating a digest of the electronic fund transfer disbursement file by performing a hash on the electronic fund transfer disbursement file;
   transferring the digest to the remote system;
   generating the authorization message by from the remote system, the authorization message being generated by the remote system performing the following steps:
   generating additional message attributes;
   generating authenticated attributes, the authenticated attributes comprising the additional message attributes and the digest;
   generating a digital signature of the authenticated attributes;
   generating a dummy data string;
   generating a dummy authorization message with the predetermined data structure, the dummy authorization message including a digest of the dummy data string; a digital signature of the digest of the dummy data string, and a digital certificate corresponding to the digital signature;
   generating the authorization message from the dummy authorization response message by making the following replacements within the dummy authorization message: i) replacing the digest of the dummy data string with the digest of the electronic fund transfer disbursement file as provided by the server; and ii) replacing the digital signature of the digest of the dummy data string with the digital signature of the digest of the electronic fund transfer disbursement file; and
   returning the authorization message to the server; and
   the server further combining the electronic fund transfer disbursement file with the authorization message to create the electronic fund transfer submission; and
   transferring the electronic fund transfer submission to the payments processor.

5. The method of claim 4 wherein:
   generating the digital signature of the authenticated attributes comprises passing the authenticated attributes to a digital signature hardware key as part of a digital signature request message and receiving, in response, the digital signature of the authenticated attributes; and generating the dummy authorization response message comprises passing the dummy data string to the digital signature hardware key as part of an authorization response request message and receiving, in response, the dummy authorization response message in the predetermined data structure.

6. The method of claim 5, further comprising:

wherein the server further authenticates a user of the remote system by:

obtaining logon credentials identifying the user of the remote system;

determining whether the logon credentials match those of an authorized user; and the step of transferring the digest to the remote system occurs only if the logon credentials match those of an authorized user.

7. The method of claim 6, wherein the server further authenticates the user of the remote system to the payments processor by:

receiving an authentication challenge from the payments processor;

transferring the authentication challenge to the remote system;

receiving an authentication response from the remote system; and transferring the authentication response to the payments processor.

* * * * *